(12) United States Patent (10) Patent No.: US 8,059,638 B2
Nam et al. (45) Date of Patent: Nov. 15, 2011

(54) INTER-NODE LINK AGGREGATION SYSTEM AND METHOD

(75) Inventors: Scott K. Nam, Glendale, CA (US);
Sindhu K. Mohandas, Thousand Oaks, CA (US)

(73) Assignee: Alcatel Lucent, Paris (FR)

( * ) Notice: Subject to any disclaimer, the term of this patent is extended or adjusted under 35 U.S.C. 154(b) by 143 days.

(21) Appl. No.: 12/459,348

(22) Filed: Jun. 30, 2009

(65) Prior Publication Data

US 2010/0329147 A1 Dec. 30, 2010

(51) Int. Cl.
H04L 12/50 (2006.01)
H04L 12/28 (2006.01)
H04L 12/56 (2006.01)
H04Q 11/00 (2006.01)

(52) U.S. Cl. ......... 370/386; 370/396

(58) Field of Classification Search ......... 370/254, 370/360, 386, 395.2, 396, 419, 237
See application file for complete search history.

(56) References Cited

U.S. PATENT DOCUMENTS

| | | | | |
|---|---|---|---|---|
| 5,764,740 A * | 6/1998 | Holender | | 379/112.05 |
| 7,457,256 B2 * | 11/2008 | Ivaldi et al. | | 370/256 |
| 2003/0118025 A1 * | 6/2003 | Lee | | 370/395.1 |
| 2005/0180749 A1 * | 8/2005 | Koley et al. | | 398/45 |
| 2007/0183376 A1 * | 8/2007 | Arai et al. | | 370/338 |
| 2007/0230357 A1 * | 10/2007 | Lin et al. | | 370/241.1 |
| 2007/0230487 A1 * | 10/2007 | Tanaka | | 370/404 |
| 2008/0285555 A1 * | 11/2008 | Ogasahara | | 370/389 |
| 2010/0246396 A1 * | 9/2010 | Licardie et al. | | 370/232 |
| 2010/0246404 A1 * | 9/2010 | Bradford et al. | | 370/237 |
| 2010/0290472 A1 * | 11/2010 | Raman et al. | | 370/395.2 |

* cited by examiner

*Primary Examiner* — Salman Ahmed
*Assistant Examiner* — Hoang-Chuong Vu
(74) *Attorney, Agent, or Firm* — S. Wyse

(57) ABSTRACT

A method and apparatus for link aggregation in a data communications network. A dual-layer link aggregation is formed, including two peer nodes, each connected to at least a third node. The dual-layer link aggregation is formed of a peer link aggregation of ports for communicating with a peer node, distant link aggregation of ports for communicating with a third node, and an outer-layer link aggregation of the ports included in the peer link aggregation and the distant link aggregation. The third node may implement an inter-node link aggregation aggregating links to each of the peer nodes. Packets may be received and forwarded by the peer nodes in such a manner as to each link aggregation to be active simultaneously.

6 Claims, 11 Drawing Sheets

STATE OF THE ART

STATE OF ART ART

INTER-NODE LINK AGGREGATION SYSTEM AND METHOD

TECHNICAL FIELD

The present invention relates generally to the field of communication networks, and, more particularly, to a method and apparatus to provide link aggregation that provides redundant communication paths while at the same time increasing transmission bandwidth.

BACKGROUND

The following abbreviations are herewith defined, at least some of which are referred to within the following description of the state-of-the-art and the present invention.
CPU Central Processing Unit
IEEE Institute of Electrical and Electronics Engineers
LAN Local Area Network
L2 Layer 2 (a reference to the OSI reference model for networks)
MAC Media Access Control
MAN Metropolitan Area Network
OSI Open Systems Interconnection (initiative)
WAN Wide Area Network Data communication networks allow many different computers, and similar devices, to communicate with each other to share data and computing resources. Such networks are regularly implemented using at least one, but usually many interconnected nodes, for example switches or routers. Individual users with personal computers, for example, may connect to a network for the purpose of communicating with other users, or for contacting servers that may be associated with a service provider. Businesses and other large institutions may use computer networks to sell merchandise or services, or simply to share information. Frequently, smaller local networks such as LANs communicate with other LANs via larger networks such as MANs and WANs.

The nodes of a network are usually interconnected by physical media, such as a wires or optical fiber cables. Data transmitted from one computer to another passes from node to node through the network until it reaches its destination. Prior to transmission, the data are divided into discrete segments called packets or frames, each carrying information identifying the source of the data and the intended destination. The communication path taken by each of the data packets through the network may vary, and some packets may be lost and have to be resent. For this reason, packets also include sequence identifiers so that the data can be reassembled at the destination into its original or some other desirable form. Packets usually carry other identifying information as well, some examples of which will be included in the description below. The portion of the packet carrying transmission information is often called a header.

One reason that data packets may take different routes through a network is traffic-related; sometimes certain portions of the network become congested and so some of the data traffic will be routed on an alternate path. Another reason is the network nodes, or the communication links between them, may occasionally fail in some way. This failure may be intentional, such as taking a node out for service, or unintentional as when a component simply breaks down.

In order to be able to transmit data from and to a variety of sources, networks typically adopt certain uniform rules dealing with various aspects of the transmission process and how the various nodes should interact with each other. These rules are often developed in a collaborative environment and promulgated by standard-setting bodies. For example, IEEE 802.3 and its many related protocols describe a system of network communication known as Ethernet. Ethernet has become a popular protocol for many implementations, large and small.

One strategy that attempts to mitigate the congestion and link failure problems mentioned above is referred to as link aggregation, which is described in IEEE 802.3ad and related protocols. In link aggregation, two or more communication ports on a network node, and the physical links communicating with them, are aggregated into a link aggregation group (LAG). The multiple ports in a LAG become a single virtual port. Data is sent and received on the virtual port as if it were a single port, except that traffic is equitably distributed onto each of the actual physical ports. As should be apparent, this increases the bandwidth of the link, and in the event one physical link fails, the one or more remaining can carry the data traffic (albeit at a reduced bandwidth) with no need to reconfigure the network.

Link aggregation can simply take the form of a two network nodes connected to each other by multiple physical links. This provides greater bandwidth and redundancy between the two, but of course if one of the nodes fails, none of its ports will be active. Another form of the link aggregation strategy is shown in FIG. 1. Note that the examples presented here in FIGS. 1 and 2, and the accompanying description, are technologies known to the inventors and presented here as background to describing the present invention without making any statement or express or implied admission relating to their applicability as prior art with respect to the present invention.

FIG. 1 is a simplified schematic diagram illustrating a network 100 implementing a link aggregation technique. Network 100 includes five sources referred to as 105, 110, 115, 120, and 125. Note these sources may be computing devices, such a personal computers or servers, or they may be considered to represent any other source of data traffic, such as another portion of a network. Each of these sources is effectively connected to each of the others by three interconnected nodes, referred to in FIG. 1 as 130, 140 and 150. Source 110 and source 115 are in direct communication with node 130; source 120 and source 125 are in direct communication with node 140; and source 105 is in direct communication with node 150. For communication between source 105 and source 110, as one example, inter-node link aggregation may be utilized.

In the example of FIG. 1, LAG 10 is indicated. LAG 10 is a link aggregation that allows node 150 to send and traffic from source 105 to source 110 along two different physical paths. The first path includes link 1 and node 130, and the second path includes link 2 and link 3 and nodes 140 and 130. Similar LAGs may be established for traffic between other sources. As with the simpler form of link aggregation mentioned above, this allows for greater bandwidth and, in the event of a failure along one of the paths, the other may be used exclusively.

One problem with this arrangement, however, arises when each element in the paths between does not know which port to associate with a particular source. For example, if source 105 sends packets destined for source 110 but nodes 130 and 140 do not know which port to use to forward the packets, they will follow the normal procedure of flooding the packets on all ports (except the port on which they were received). A loop could be created in which node 150 receives the packets back, when it may again attempt to flood the packets.

One manner of mitigating this problem is shown in FIG. 2. FIG. 2 is a simplified schematic diagram illustrating network 100 implementing another link aggregation technique. As should be apparent, this configuration is very similar to the configuration of network 100 as depicted in FIG. 1, except that LAG 10 now uses only Link 1 as an active link, while Link 2 is in a stand-by mode (as indicated in FIG. 2 by a broken line). In this configuration, if a failure of Link 1 is detected, LAG 10 automatically begins using Link 2 instead, and typically continues to do so until a need for reconfiguration becomes evident.

It is noted that the network 100 of FIG. 2 is, while Link 1 is active, configured similarly to a network implementing STP, a loop-prevention scheme described in IEEE 802.1D and related protocols. The advantage of using a link aggregation instead in this scenario is that the change from using only Link 1 to using only Link 2 can be executed much more quickly. The disadvantage remains, however, that with only one of the links active, the improved bandwidth normally associated with link aggregation cannot be achieved.

Needed then, is a manner of exploiting both the increased bandwidth and the natural redundancy of link aggregation, especially in the inter-node environment.

SUMMARY

The present invention provides a method and apparatus for link aggregation in a communications network that is directed at increasing bandwidth while exploiting the redundancy of link aggregation configurations. In particular, the present invention is directed to a manner of enhancing link aggregation in data communication networks using a new configuration referred to herein as dual-layer link aggregation. Dual-layer link aggregation includes two aggregation layers, and is of particular advantage when implemented in an inter-node link aggregation environment.

In one aspect, the present is method of link aggregation in a communication network node, which may for example be a switch or a router, including aggregating a first plurality of node ports that are to be used for communicating with a second node, which can be considered a peer node, and aggregating a second plurality of node ports that are to be used for communicating with a third node, which may be considered a distant node. The peer link aggregation and the distant link aggregation are the inner-layer link aggregations, and an outer-layer link aggregation is formed by aggregating a third plurality of node ports, where the third plurality of node ports includes first plurality of node ports and the second plurality of node ports. In the network, the distant link aggregations join each of the two peer nodes to the third node. In a preferred embodiment, the communication network node is arranged to add header information including at least a source port number and a packet type to each packet forwarded on the peer link aggregation. Using the dual-layer link aggregation, traffic is transmitted through the network in such a way as to allow all links to be active at the same time.

In another aspect, the present invention is a node such as a switch or router for use in a data communication network including a dual-layer link aggregator, a CPU coupled to the dual-layer link aggregator, and to a buffer for storing packets that are received at the node, and to an L2 hardware lookup table for associating entities with ports or link aggregations of the node. The dual-layer link aggregator includes a peer link aggregator for allocating traffic on a peer link aggregation that is in direct communication with a peer node that also comprises a dual-layer link aggregator, a distant link aggregator for allocating traffic on a distant link aggregation that is in direct communication with a third node, and an outer-link aggregator for allocating traffic on an outer-layer link aggregation that includes the port of the peer link aggregation and the distant link aggregation. In a preferred embodiment, the dual-layer link aggregator is arranged to examine packets received in the node to determine their source and their destination, and the peer aggregator is arranged to add header information, including a source port number and a packet type, to each packet to be forwarded on the peer link aggregation. In this embodiment, the L2 hardware lookup table does not associate any packet source with the distant link aggregation regardless of the port on which the packet was received, and the peer link aggregator is arranged to insert a value indicating the outer-layer link aggregation as a source port number into the header of any packet received on the distant link aggregation and for which the destination is not associated with any port on the L2 hardware lookup table. Preferably, the peer link aggregator is also arranged to insert a value indicating the outer-layer link aggregation as a source port number into the header of any packet received on the distant link aggregation and for which the destination is associated with the peer link aggregation on the L2 hardware lookup table.

In another aspect, the present invention is a method of aggregation at a network node in support of an inter-switch link aggregation at a third node, including forming a dual-layer link aggregation, where the dual-layer link aggregation includes a peer link aggregation comprising a plurality of links joining a first peer node and a second peer node, a first distant communication path comprising at least one link from the first peer node to an inter-switch link aggregation at the third node, a second distant communication path comprising at least one link from the second peer node to a the inter-switch link aggregation at the third node, a first outside link aggregation comprising the peer link aggregation and the first distant communication path, and a second outside link aggregation comprising the peer link aggregation and the second distant communication path.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

In order to address the shortcomings of the present state of the art, the present invention provides a method and apparatus for link aggregation in a communications network that is directed at increasing bandwidth while exploiting the redundancy of link aggregation configurations. In particular, the present invention is directed to a manner of enhancing link aggregation in data communication networks using a new configuration referred to herein as dual-layer link aggregation. Dual-layer link aggregation includes two aggregation layers, and is of particular advantage when implemented in an inter-node link aggregation environment. This two-layer aggregation will now be explained in more detail in reference to FIGS. 3 through 8.

Figure 1:
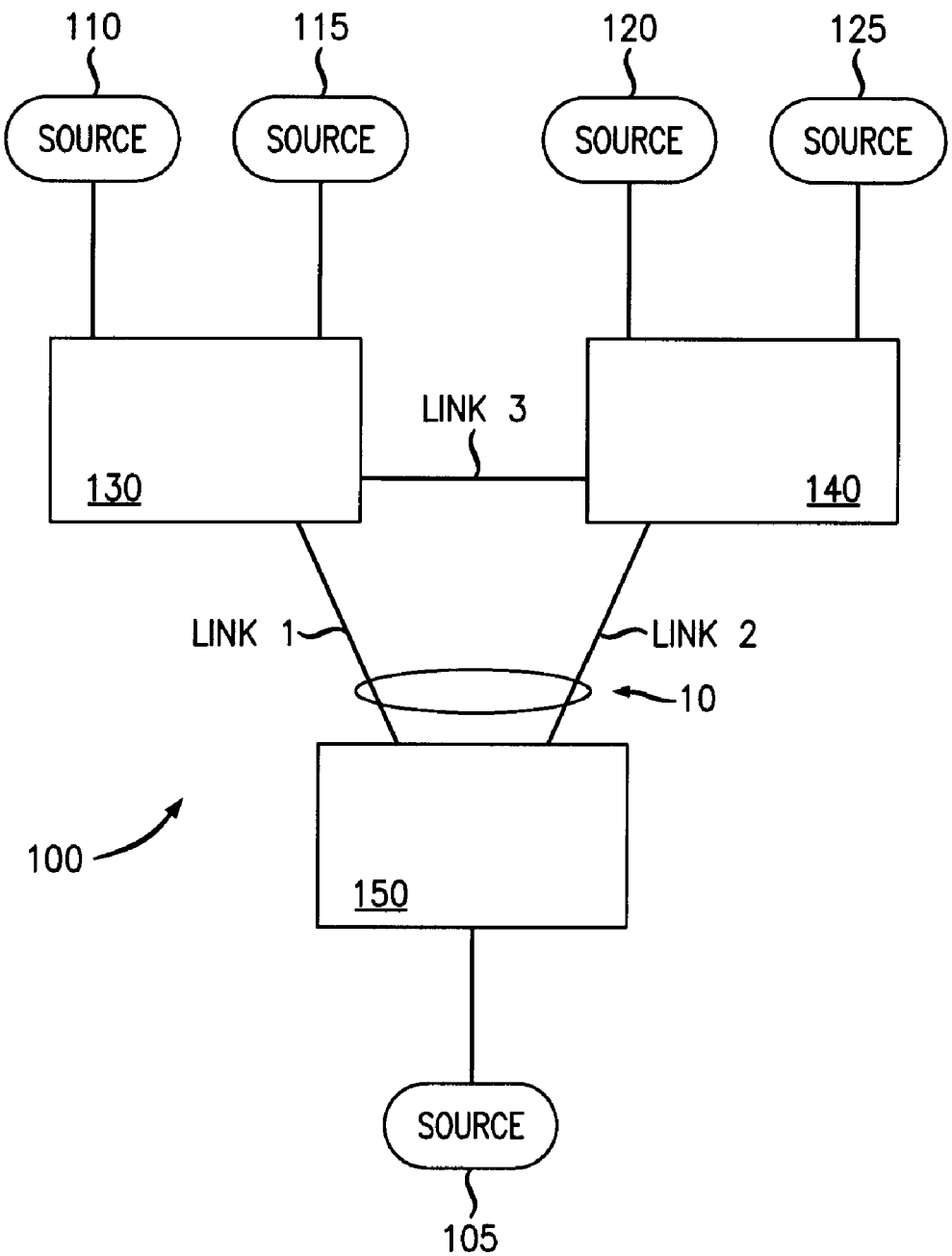
FIG. 1 is a simplified schematic diagram illustrating a network implementing a link aggregation technique.
Figure 2:
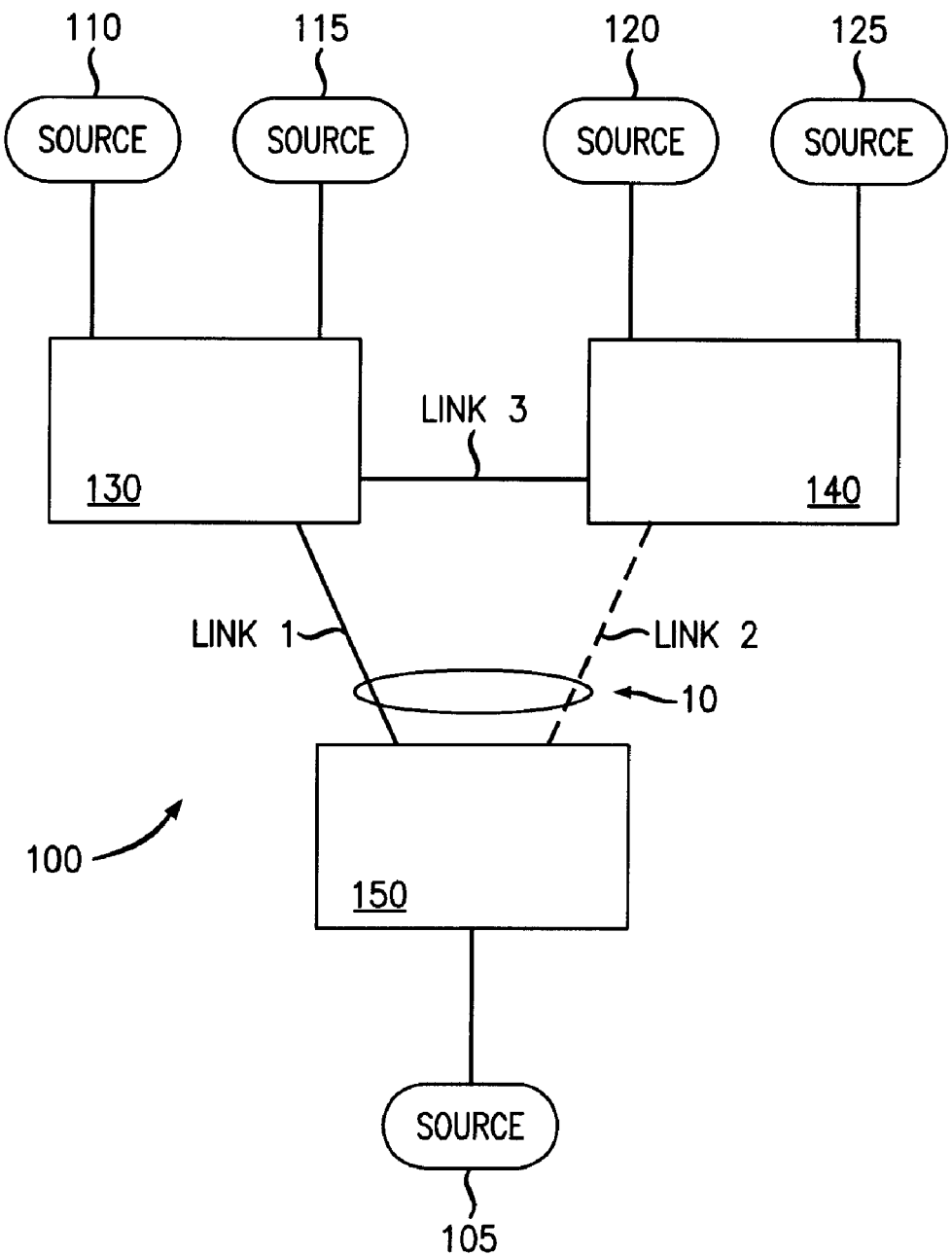
FIG. 2 is a simplified schematic diagram illustrating network implementing another link aggregation technique.
Figure 3:
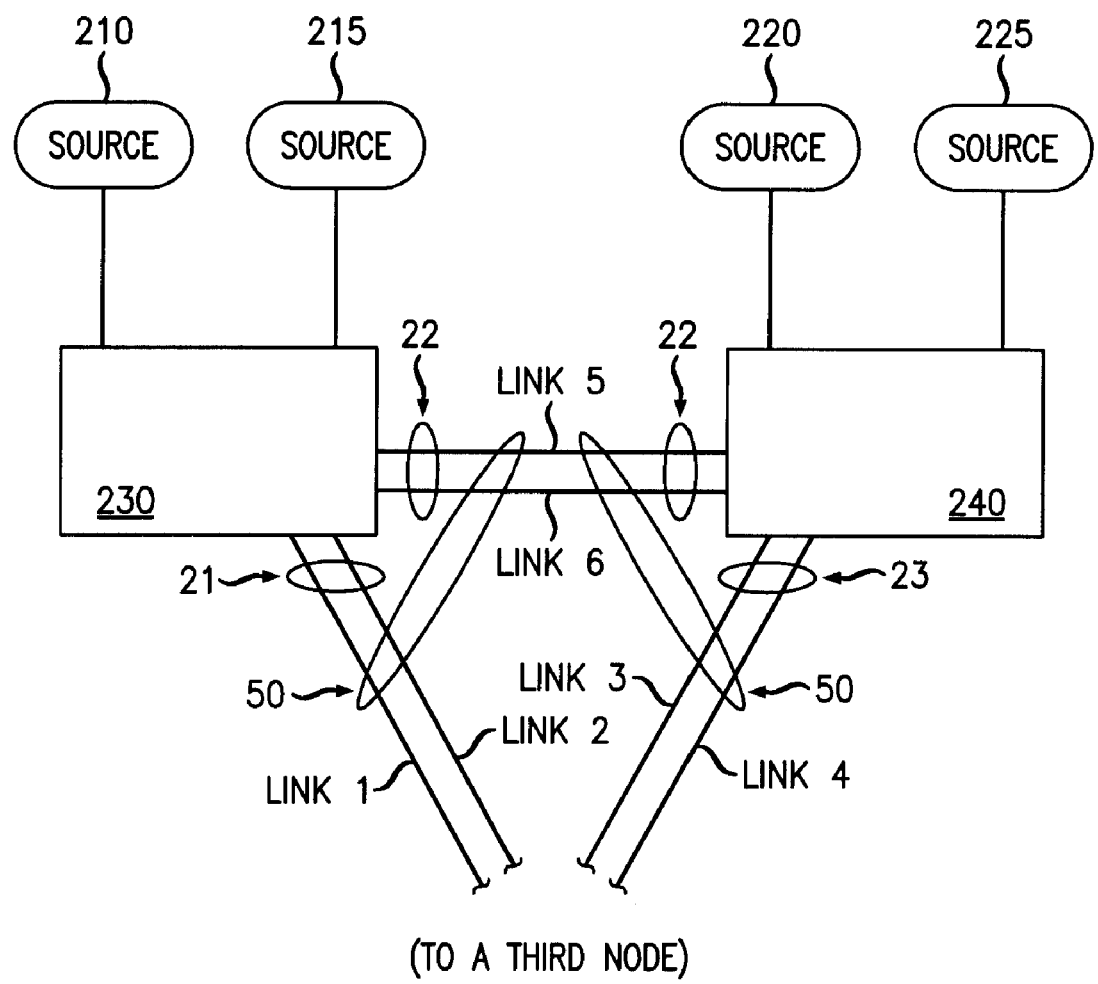
FIG. 3 is a simplified schematic diagram illustrating a communication network configured according to an embodiment of the present invention.

FIG. 3 is a simplified schematic diagram illustrating a communication network 200 according to an embodiment of the present invention. As should be apparent, many components of network 200 are similar to those present in network 100 of FIGS. 1 and 2, and similar components are numbered analogously. No implication is intended, however, that the networks or network components are identical except where explicitly stated or apparent from the context. In this light, the configuration of network 200 will now be explained in more detail.

In this embodiment, network 200 includes four sources referred to as 210, 215, 220, and 225. As with network 100, these sources may be computing devices, such a personal computers or servers, or they may be considered to represent any other source of data traffic, such as another portion of a network. Each source of network 200 is effectively connected to each of the others by two interconnected nodes, referred to in FIG. 2 as 230 and 240. Source 210 and source 215 are in direct communication with node 230, and source 220 and source 225 are in direct communication with node 240.

As illustrated in FIG. 3, in this embodiment, nodes 230 and 240 are connected to the each other by two physical links referred to as Link 5 and Link 6. In addition, node 230 includes ports serving Link 1 and Link 2, which are for the purpose of connecting to a third node. Likewise, node 240 includes ports serving Link 3 and Link 4, which are also for the purpose of connecting to a third node, that is, the same node that connects to node 230. Note that there may be more, or in some cases fewer links between the nodes, and that there may be other ports on either node that communicate with entities not mentioned above.

Each of the links shown in FIG. 3 could, of course, form an independent communication path from its respective node port to any port on another node. In accordance with the present invention, however, a new dual-layer link aggregation configuration with be implemented. Dual-layer link aggregation consists of two layers of link aggregation; inner-layer link aggregation and outer-layer link aggregation, with the former being in a sense a subset of the latter. The inner-layer link aggregation includes both a peer link aggregation and distant link aggregation. Peer link aggregation connects one dual-layer link aggregation to the other dual-layer link aggregation, and distant link aggregation connects each of two dual-layer link aggregation nodes to a third node.

In the embodiment of FIG. 3, the dual-link layer aggregations occur at node 230 and node 240, and hence the peer link aggregation 22 is disposed between them, consisting of Link 5 and Link 6. Note that peer link aggregation can be viewed as two separate link aggregations, one at two ports of node 230, and one at two ports of node 240. With respect to node 230, the distant link aggregation 21 consists of Link 1 and Link 2; with respect to node 240, the distant link aggregation 23 consists of Link 3 and Link 4. The peer link integrations and the distant link integrations together make up the outer-layer link aggregation. That is, with respect to node 230, the outer-layer aggregation 50 consists of Links 1 and 2 and Links 5 and 6; with respect to node 240, the outer-layer link aggregation 50 consists of Links 3 and 4 and Links 5 and 6.

In accordance with this embodiment of the present invention, the peer link aggregation includes a requirement that each packet it transmits between node 230 and node 240 include header information having a value corresponding to a source port number and to a packet type. The packet type in this embodiment is either L2 unicast or L2 broadcast.

Once aggregated, each link aggregation may be treated by its respective node as a single (virtual) port. Each link aggregation in this embodiment is coupled with a link aggregator including a hashing algorithm for allocating traffic to be forwarded on the link aggregation on to a specific port. For the peer aggregation link, the aggregator also ensures that each packet contains the proper additionally required header information. Each node includes an L2 hardware lookup table for storing associations between packet sources and specific ports or link aggregations.

Figure 4:
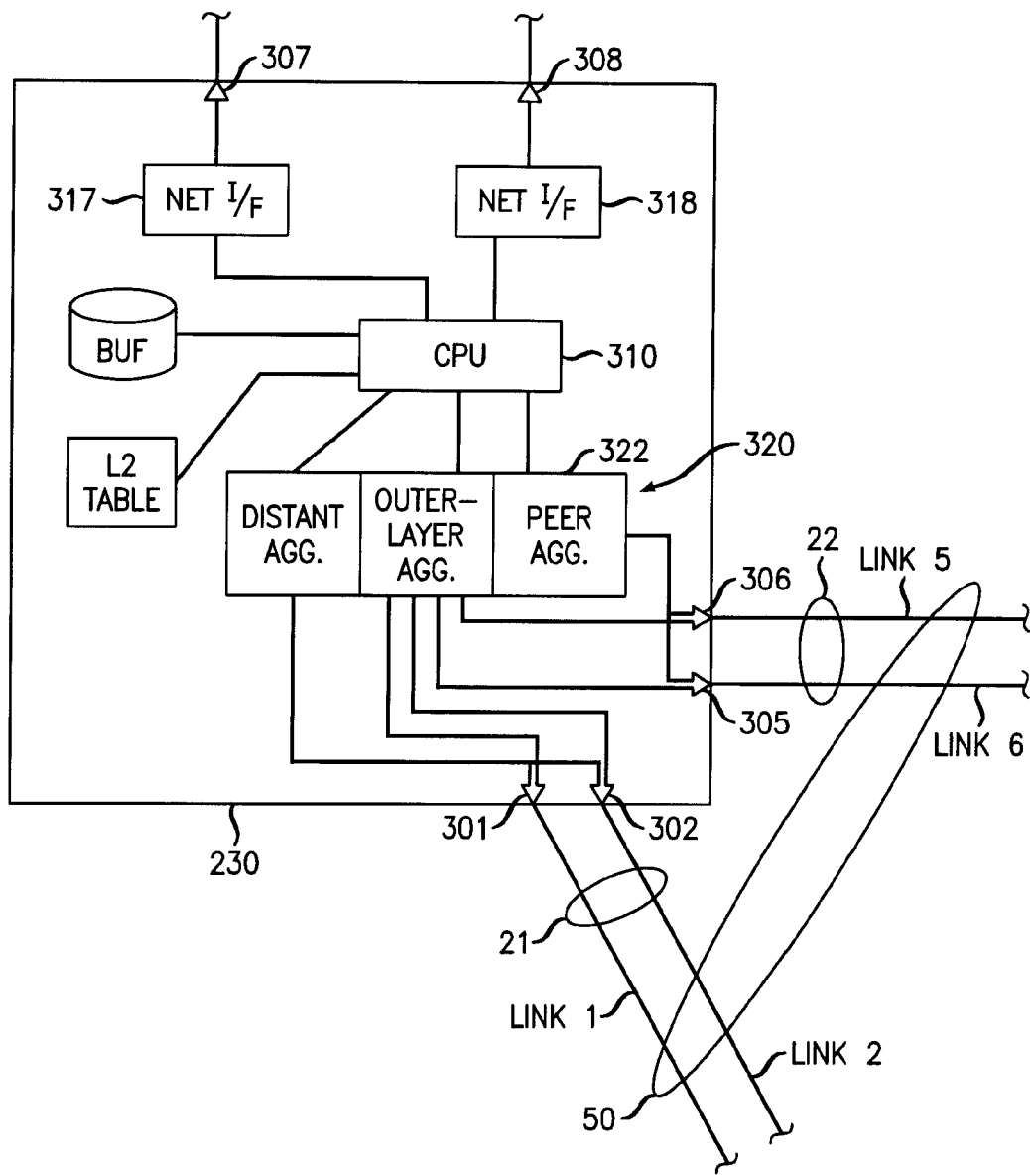
FIG. 4 is a simplified block diagram illustrating a peer node according to an embodiment of the present invention.

FIG. 4 is a simplified block diagram illustrating a peer node 300 according to an embodiment of the present invention. Peer node 300 is so-called only for the reason that it is intended for creating and forwarding packets on a peer aggregation link of the dual-layer aggregation in accordance with the present invention. Peer node 300 therefore includes port 305 and port 306, which are for communicating with a second peer node over a physical links of some kind. Also present are port 301 and port 302, which are similarly for communicating with a third node (that is, a node that is not a dual-layer link aggregation peer node), which is sometimes referred to herein as a "distant" node.

In the embodiment of FIG. 4, port 307 and port 308 are for communicating with data sources outside of the dual-layer link aggregation itself, and are therefore often present (see, for example, FIG. 3) even though they are not required. If present in node 300, there is no requirement, of course, that they actually be connected to another device. In the embodiment of FIG. 3, ports 307 and 308 are coupled to network interfaces 317 and 318 respectively, which in turn operate under the control of CPU 310. Facilitating the receipt and forwarding of data packets, network interfaces 317 and 318 also examine each packet for source and destination information. When a received packet indicates that the port on which it was received is associated with a given source, this association is stored by CPU 310 on L2 hardware lookup table 330. Packets that are received and not yet forwarded are stored in buffer 315, which is also coupled to CPU 310. CPU 310 also controls dual-layer aggregator 320, which allocates traffic on the inner-layer and outer-layer link aggregations.

In accordance with this embodiment of the present invention dual-layer aggregator 320 includes a peer aggregator 322, which allocates traffic being forwarded on a peer link aggregation. As mentioned above, the peer link aggregator also ensures that each packet contains the proper additionally required header information. Dual-layer aggregator 320 also includes a distant link aggregator 326, which allocates traffic on a distant, that is, non-peer inner-layer link aggregation of the dual-layer link aggregation. Finally, dual-layer aggregator 320 includes an outer-layer link aggregator 324, which allocates traffic on the outer-layer link aggregation of the dual-layer link aggregation. As should be apparent, the outer-layer link aggregation includes the same ports as the peer link aggregation and the distant peer aggregation. Note that in alternate embodiment (not shown, dual-link aggregator 320 need not include separate subcomponents, but rather have a single aggregator arranged to allocate traffic on any of the link aggregations according to instructions from the CPU 310.

In the embodiment of FIG. 4, the dual-layer aggregator 320 also receives packets from each of the peer, distant, outer layer link aggregations, examines each packet for source and destination information, and may remove unnecessary packet header information when it is no longer necessary.

Figure 5:
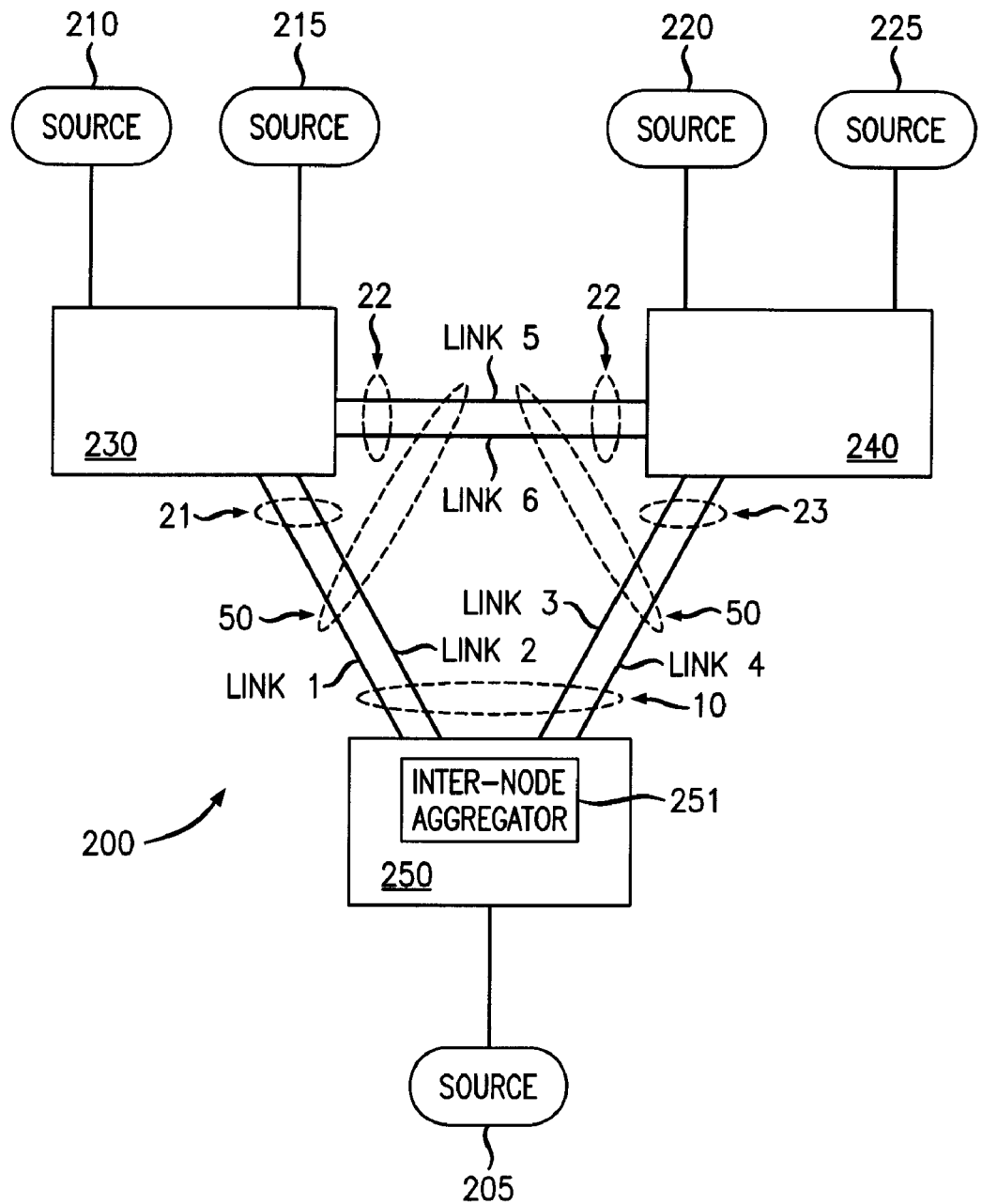
FIG. 5 is a simplified schematic diagram illustrating communication network according to another embodiment of the present invention.

FIG. 5 is a simplified schematic diagram illustrating communication network 200 according to another embodiment of the present invention. As should be apparent, in this embodiment, nodes 230 and 240 are configured as described in reference to FIG. 3. In addition, in this embodiment network 200 includes a distant node 250, which is connected to node 230 by Link 1 and Link 2, and to node 240 by Link 3 and Link 4. Inter-node aggregation is used in this embodiment. Node 250 includes inter-node aggregator 251, which allocates traffic on the inter-node link aggregation that includes Links 1 through 4. Other components analogous to those illustrated in FIG. 3 may also be present, but for clarity are not shown in FIG. 5. Inter-node link aggregation 100 is a link aggregation that allows node 250 to send traffic, for example, from source 205 to source 210 along two different paths. The first path includes an aggregation of Links 1 and 2 and node 230, and the second path includes aggregations of Links 3 and 4 and Links 5 and 6, as well as nodes 240 and 230. Dual-layer link aggregation is of particular advantage in the inter-node aggregation environment. Operation of dual-layer link aggregation will now be examined in more detail.

Referring to the network 200 of FIG. 5, when a packet is received from source 210, it is examined and its source and intended destination are determined. If necessary, the L2 hardware lookup table is updated to associate the receiving port with the source indicated in the packet header information. This, of association, of course, will be used to forward other packets received in the future. The L2 hardware lookup table is also consulted to determine on which port to forward the packet received from source 210. If the destination is unknown to node 230, then the packet is flooded on both the peer link aggregation 22 and the distant link aggregation 21.

If the forwarding port (or virtual port) is known to be the peer link aggregation 22, then in accordance with this embodiment of the present invention node 230 adds header information, if necessary, indicating packet type, and forwards the packet to peer link aggregation 22. If the forwarding port is known to be the outer-layer link aggregation 50, then in accordance with this embodiment of the present invention node 230 forwards the packet to outer-layer link aggregation 50. Note that in accordance with this embodiment of the present invention, no association with the distant link aggregation will be made, and so the packet received from source 210 will not be forwarded on the distant link aggregation except where the destination is unknown and the packet is flooded, as described above.

In accordance with this embodiment of the present invention, packets received in node 230 from the distant link aggregation are processed as follows. The packets are examined to determine their source and intended destination. If necessary, the source is associated in the L2 hardware lookup table with the outer-layer aggregation 50. Note again that packet sources are not associated in the L2 hardware lookup table with the distant link aggregation 21. If the intended destination of the packet is unknown, that is, not associated with a port or link aggregation on the L2 hardware lookup table, the packet is flooded to all ports, including peer link aggregation 22. In this embodiment, when the packet is forwarded in the peer link aggregation, the flood control limit is not applied and the packet header contains the outer-layer link aggregation 50 as the source port number. If the intended destination of the packet is know to be associated with the peer link aggregation, the packet is forwarded on the peer link aggregation 22 with the outer-link aggregation 50 as the source port number.

In accordance with this embodiment of the present invention, packets received in node 230 from the peer link aggregation 22 are processed as follows. The packets are examined to determine their source and intended destination. If the source port number in the packet header identifies the outer-layer link aggregation 50, then that association is made in the L2 hardware lookup table, otherwise, an association with the peer link aggregation 22. If the intended packet destination is unknown, the packets are flooded to all ports except the distant link aggregation 21. If the intended destination is associated with the outer-layer link aggregation 50, then the packets are forwarded on the outer-layer link aggregation, but only using the distant link aggregator, that is, on a port selected according to the distant link has algorithm. In this embodiment, of course, this would not include Link 5 or Link 6.

Note that although reference is made to node 230 for the purpose of describing the present invention, it should be apparent that node 240 will receive and forward packets in an analogous fashion.

Figure 6A:
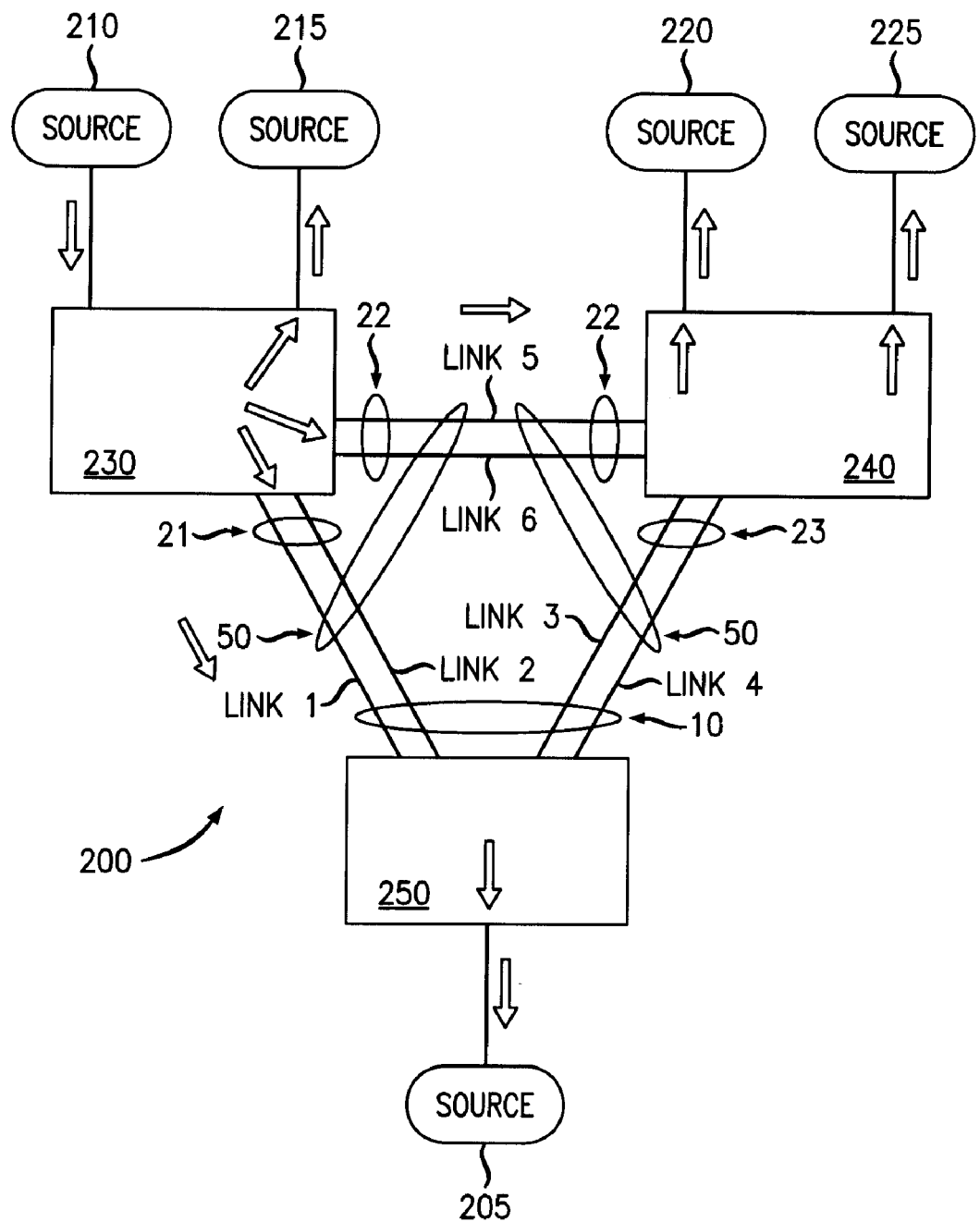
FIGS. 6a through 6c are simplified schematic diagrams illustrating packet flow in a network according to an embodiment of the present invention.
Figure 6B:
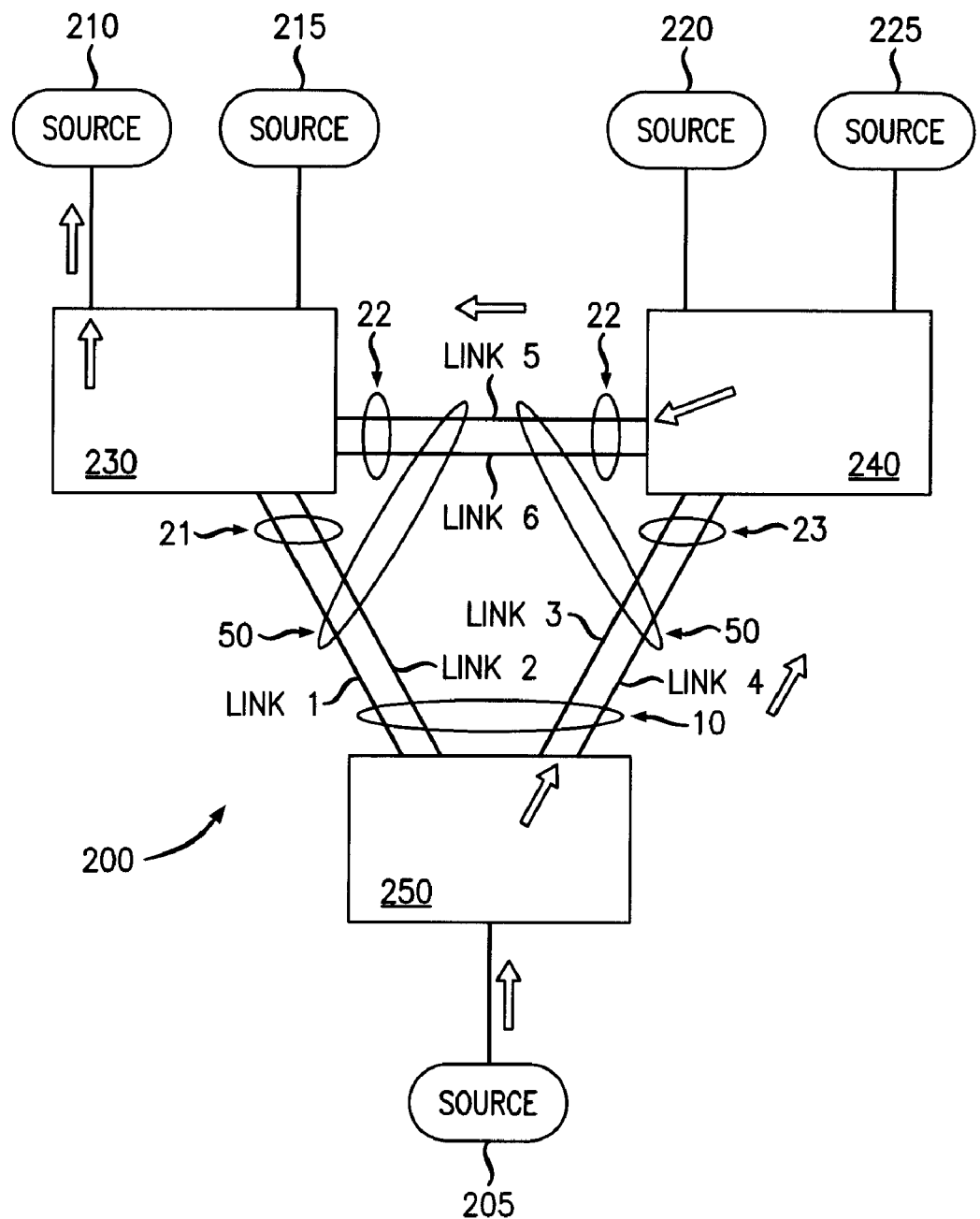
Figure 6C:
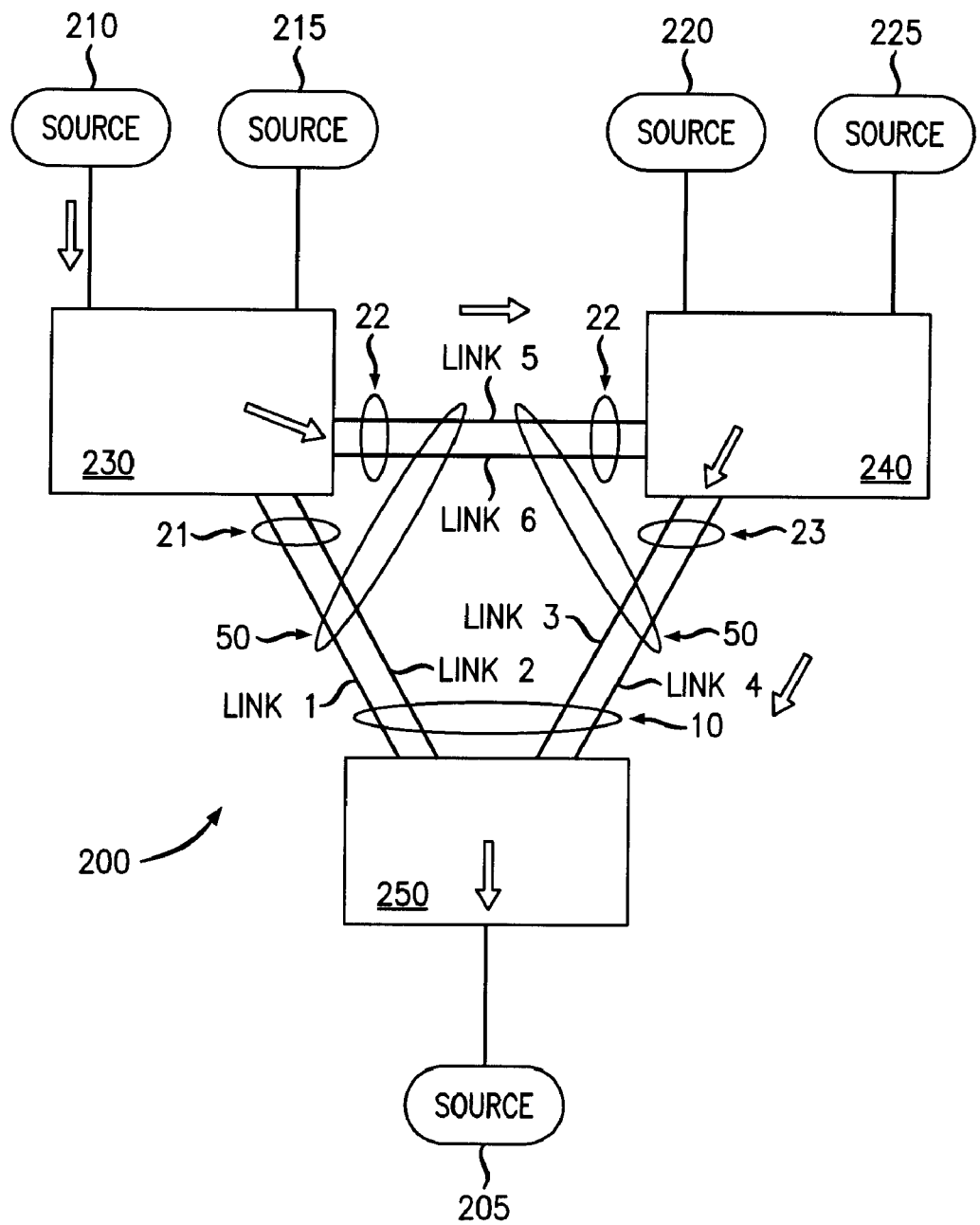

Operation of dual-layer link aggregation will now be examined in more detail in reference to FIGS. 6a through 6c. FIGS. 6a through 6c are simplified schematic diagrams illustrating packet flow in the network 200 according to an embodiment of the present invention. FIG. 6a illustrates the packet flow when source 210 is sending packets to source 205, in this case assuming that source 205 is unknown to the network. When the packets from source 210 arrive in node 230, they are examined to determine their source and destination. Node 230 records in its L2 hardware lookup table the association between source 210 and the receiving port. Since source 205 is unknown, the packets are flooded to all ports (except the receiving port) as broadcast packets.

A similar process takes place when the packets arrive at node 240, where an association between source 210 and peer link aggregation 22 will be made in the L2 hardware lookup table. Since source 205 is unknown to node 240, the packets will be flooded. In accordance with this embodiment of the present invention, however, the packets will be flooded to all ports except the distant link aggregation 23. As noted above, packets received on peer link aggregation 22 are not flooded on the distant link aggregation 23.

Here it is also noted that when packets arrive at the sources 215, 220, and 225, they will each realize that they are not the intended destination and, in this embodiment, simply discard the packets.

When the packets are received in node 250, they will be examined to determine their source and destination. An association between source 210 and inter-node link aggregation 100 will be made in the L2 hardware lookup table of node 250. Since node 250 does not associate source 205 with any port, the packets will be flooded on all ports. Note, however, that in this embodiment this does not include the ports associated with Link 3 and Link 4, since they form part of inter-node link aggregation 100 on which they were received. The packets will then arrive at source 205, their intended destination.

FIG. 6b illustrates the packet flow when source 205 replies to source 210. When the packets arrive at node 250 from source 205, they are examined to determine their source and destination. Node 250 records the association between source 205 and the receiving port in its L2 hardware lookup table and, since it associates source 210 with inter-node link aggregation 100, forwards the packets as unicast packets thereon. Note that this effectively involves a choice between forwarding the packet to either node 230 or node 240; for purposes of illustration, it is assumed that a port leading to node 240 is chosen. When the packets arrive in node 240, they are examined to determine their source and destination. An association between source 205 and outer-layer link aggregation 50 is recorded in the L2 hardware lookup table of node 240 and, since an association between source 210 and peer aggregation 22 is known, the packets are forwarded thereon.

In the embodiment of FIG. 6b, when the packets arrive in node 230, they are examined to determine their source and destination. An association between source 205 and outer-layer link aggregation 50 is recorded in the L2 hardware lookup table of node 230 and, since source 210 is associated with a known port, the packets are forwarded thereon. The packets will then arrive at source 210, their intended destination.

FIG. 6c illustrates the packet flow when source 210 sends packets to source 205, now a known destination. When the packets form source 210 arrive in node 230 they are examined, and since an association between source 205 and outer-layer link aggregation 50 is known, the packets are forwarded thereon. Note that this effectively involves a choice between sending them to node 240 or node 250; for purposes of illustration, it is assumed that a port leading to node 240 is chosen. When the packets arrive in node 240 from outer-layer link aggregation 50, they are examined. Since an association between source 205 and distant link aggregation 23 is known, the packets are forwarded thereon. When the packets are received at node 250, they are examined and, since source 205 is associated with a known port, the packets are forwarded thereon. The packets will then arrive at source 205, their intended destination.

Figure 7A:
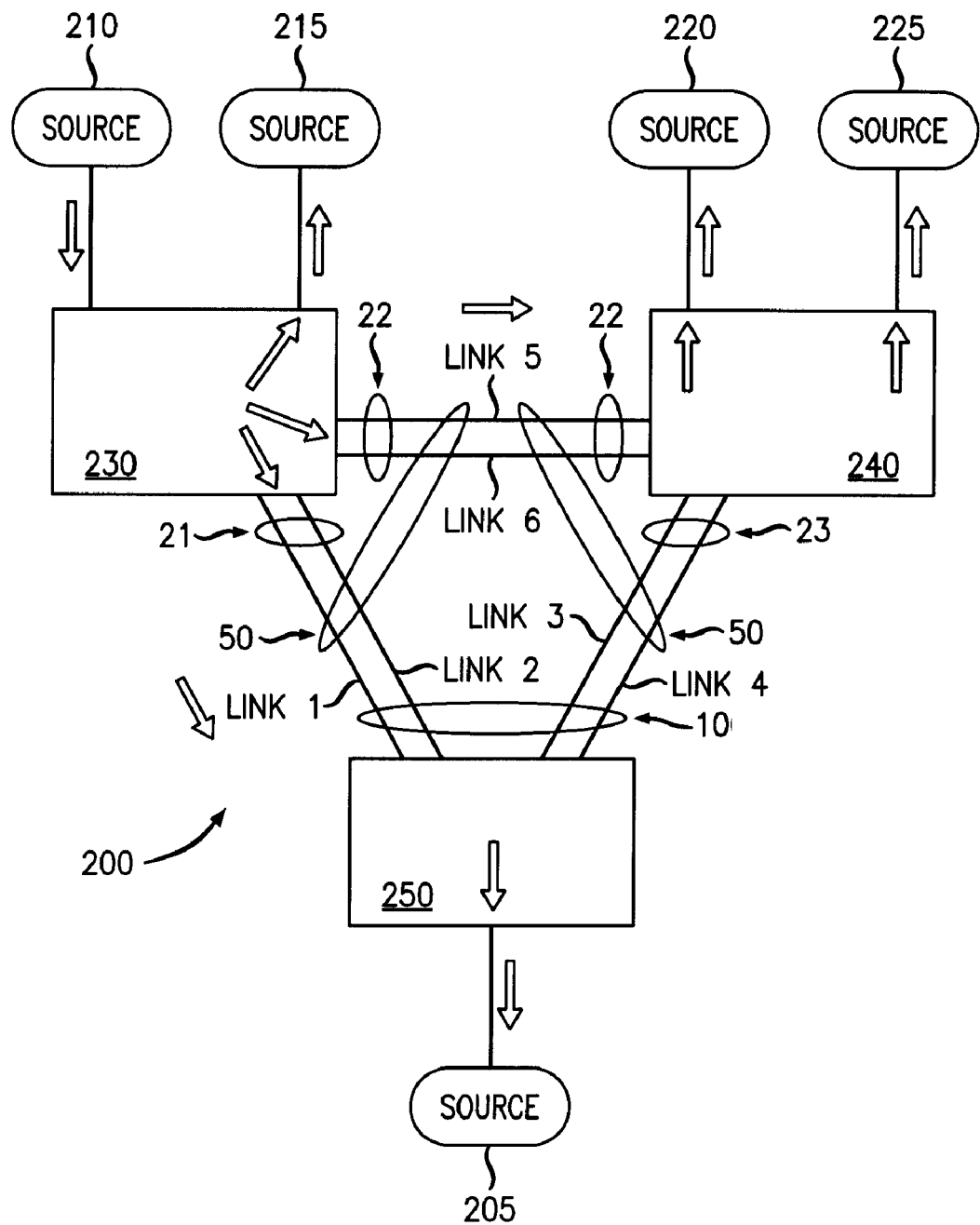
FIGS. 7a and 7b are simplified schematic diagrams illustrating a somewhat different packet flow in a network according to an embodiment of the present invention.
Figure 7B:
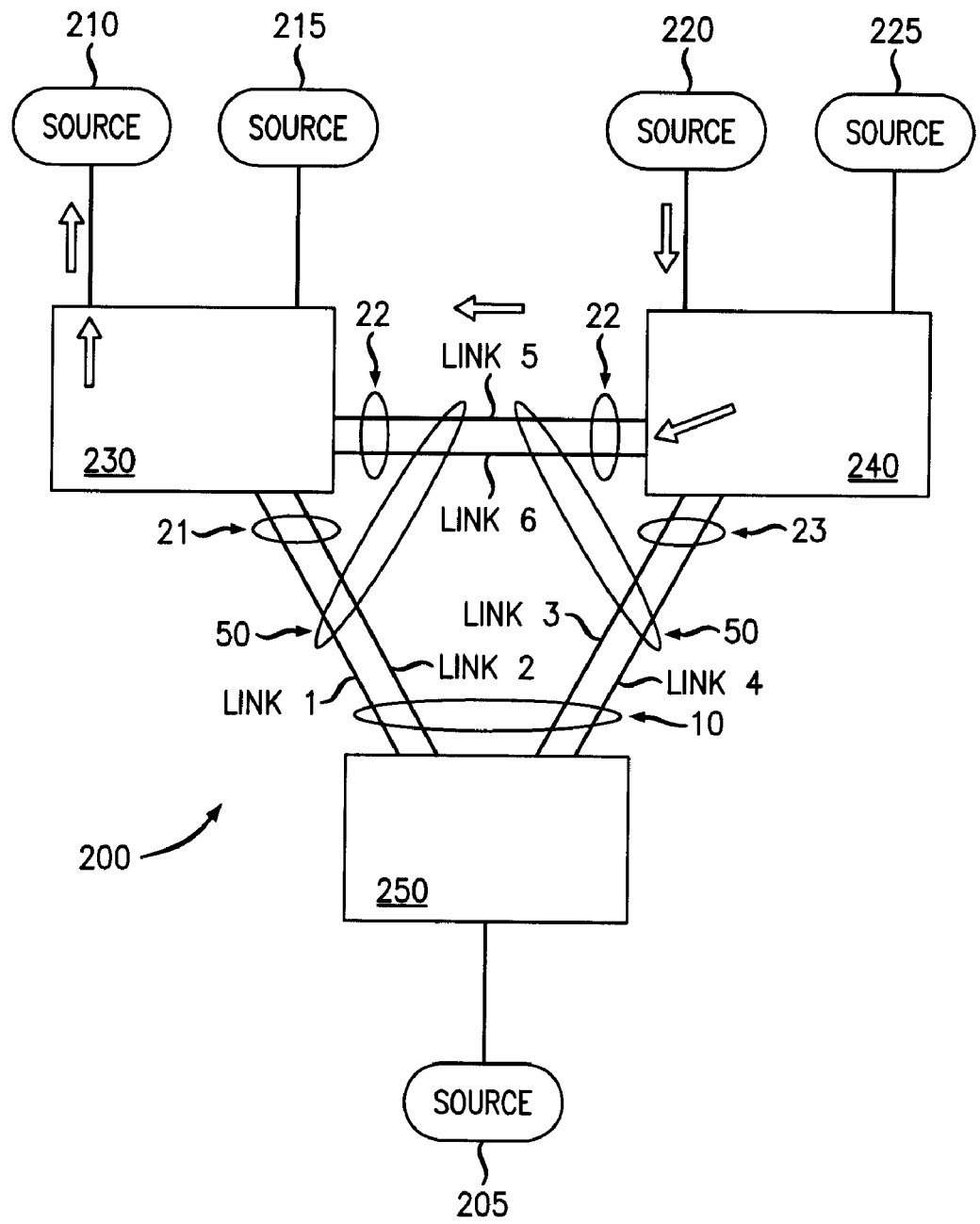

FIGS. 7a and 7b are simplified schematic diagrams illustrating a somewhat different packet flow in the network 200 according to an embodiment of the present invention. FIG. 7a illustrates the packet flow when source 210 is sending packets to source 220, in this case assuming that source 220 is unknown to the network. When the packets from source 210 arrive in node 230, they are examined to determine their source and destination, and an association between source 210 and the receiving port is made in the L2 hardware lookup table. Since no port is currently associated with source 220, the packets will be flooded on all ports as broadcast packets. When the packets arrive at node 250, they are examined and an association between source 210 and inter-node link aggregation 100 is made in the L2 hardware lookup table. Since no port is currently associated with source 220, the packets will be flooded on all ports as broadcast packets. Note that in the embodiment of FIG. 7c, this does not include any of the ports associated with inter-node link aggregation 100.

In the embodiment of FIG. 7a, when the packets are received at node 240, they are examined and an association between source 210 and peer aggregation 22 is made in the L2 hardware lookup table. Since no port is currently associated with source 220, the packets will be flooded on all ports except, in accordance with the present invention, distant link aggregation 23. The packets will then arrive at source 220, their intended destination.

FIG. 7b illustrates the packet flow when source 220 replies to source 210. When the packets arrive at node 240 from source 210, they are examined and an association between source 220 and the receiving port is made in the L2 hardware lookup table. Since source 210 is associates with peer link aggregate 22, the packets are forwarded thereon. When the packets arrive in node 230, they are examined and an association between source 220 and peer link aggregate 22 in the L2 hardware lookup table. Since source 220 is associated with a known port, the packets are forwarded thereon. The packets will then arrive at source 210, their intended destination.

Figure 8:
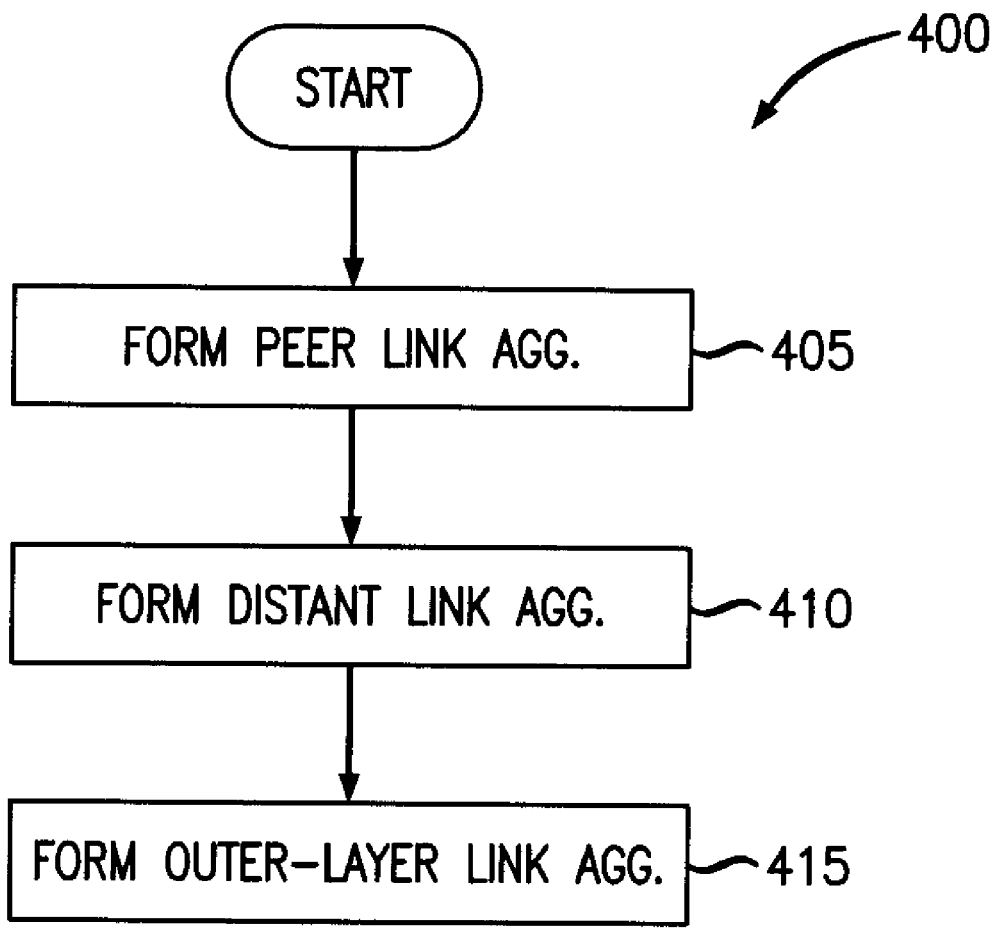
FIG. 8 is a flow diagram illustrating a method for link aggregation in a communication network node according to an embodiment of the present invention.

FIG. 8 is a flow diagram illustrating a method 400 for link aggregation in a communication network node according to an embodiment of the present invention. At START it is presumed that the components necessary to performing the method are available and operational according to the present invention. The process then begins with aggregating a first plurality of node ports (step 405), forming a peer link aggregation to a peer node. In a preferred embodiment, the node is arranged (step not shown) to add header information to each packet forwarded on the first plurality of nodes, the header information comprising a source port number and a packet type. A second plurality of node ports is then aggregated (step 410), the second plurality of node ports forming a distant link aggregation to third node that is also in communication with the peer node. A third plurality of node ports is then aggregated (step 415), forming an outer layer link aggregation including all of the ports in the first plurality of node ports and the second plurality of node ports. Note that the steps of method 400 can be performed in any logically-consistent order, and in some embodiments other steps may be added without departing from the spirit of the invention.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A node for use in a data communication network, comprising:
 a dual-layer link aggregator, comprising:
  a peer link aggregator for allocating traffic on a peer link aggregation comprising a first plurality of ports, the peer link aggregation for communicating with a peer node of the node, wherein the peer node comprises a peer-node dual-layer link aggregator, wherein the peer link aggregator is arranged to add header information to each packet to be forwarded on the peer link aggregation, the header information comprising a source port number and a packet type;
  a distant link aggregator for allocating traffic on a distant link aggregation comprising a second plurality of ports, the distant link aggregation for communicating with a third node that is also in communication with the peer node; and
  an outer-link aggregator for allocating traffic on an outer-layer link aggregation comprising the first plurality of ports and the second plurality of ports; and wherein the dual-layer link aggregator is arranged to examine packets received in the node to determine their source and destination;

a CPU (central processing unit) coupled to the dual-layer link aggregator;

a buffer for storing packets that are received at the node; and an L2 (Layer 2) hardware lookup table for associating entities with ports or link aggregations of the node, wherein the L2 hardware lookup table does not associate any packet source with the distant link aggregation regardless of the port on which the packet was received; and wherein the peer link aggregator is arranged to insert a value indicating the outer-layer link aggregation as a source port number into the header of any packet received on the distant link aggregation and for which the destination is not associated with any port on the L2 hardware lookup table.

2. The node of claim 1, wherein the node is a switch.

3. The node of claim 1, wherein the node is a router.

4. The node of claim 1, wherein the first plurality of ports comprises two ports.

5. The node of claim 1, wherein the second plurality of ports comprises two ports.

6. The method of claim 1, wherein the third node comprises a plurality of nodes aggregated in an inter-node link aggregation comprising ports of the third node that communicate with the node and with the peer node.

* * * * *